United States Patent
Sun et al.

(10) Patent No.: US 10,903,873 B2
(45) Date of Patent: Jan. 26, 2021

(54) WIRELESS COMMUNICATION METHOD AND ASSOCIATED WIRELESS DEVICE

(71) Applicant: MEDIATEK INC., Hsin-Chu (TW)

(72) Inventors: Juei-Ting Sun, Hsinchu (TW);
Yu-Ming Wen, Hsinchu (TW);
Chang-Yi Hsu, Hsinchu (TW);
Po-Hsun Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 47 days.

(21) Appl. No.: 15/963,988

(22) Filed: Apr. 26, 2018

(65) Prior Publication Data

US 2019/0123867 A1    Apr. 25, 2019

Related U.S. Application Data

(60) Provisional application No. 62/575,585, filed on Oct. 23, 2017.

(51) Int. Cl.
*H04W 16/04* (2009.01)
*H04W 16/14* (2009.01)
*H04B 1/715* (2011.01)
*H04L 5/00* (2006.01)

(52) U.S. Cl.
CPC ............. *H04B 1/715* (2013.01); *H04L 5/003* (2013.01); *H04L 5/0058* (2013.01); *H04W 16/04* (2013.01); *H04W 16/14* (2013.01); *H04B 2201/71323* (2013.01); *H04B 2201/71346* (2013.01)

(58) Field of Classification Search
CPC ................... H04B 1/713; H04B 1/715; H04B 2201/7134; H04W 16/14
See application file for complete search history.

(56) References Cited

U.S. PATENT DOCUMENTS

| | | | |
|---|---|---|---|
| 8,442,016 B1 * | 5/2013 | Lee .................. | H04W 72/1215 370/338 |
| 8,805,397 B2 * | 8/2014 | Sen .................... | H04W 72/082 455/426.1 |

FOREIGN PATENT DOCUMENTS

CN    101383621 B    10/2012

\* cited by examiner

*Primary Examiner* — Robert M Morlan
(74) *Attorney, Agent, or Firm* — Winston Hsu

(57) ABSTRACT

The present invention provides a wireless communication method of a wireless device, wherein the wireless communication method comprises: dynamically controlling/adjusting channels used by the first wireless module by increasing or decreasing a guard band between communications of the first wireless module and the second wireless module.

10 Claims, 5 Drawing Sheets

US 10,903,873 B2

WIRELESS COMMUNICATION METHOD AND ASSOCIATED WIRELESS DEVICE

CROSS REFERENCE TO RELATED APPLICATIONS

This application claims the priority of U.S. Provisional Application No. 62/575,585, filed on Oct. 23, 2017, which is included herein by reference in its entirety.

BACKGROUND

Within a 2.4 GHz industrial, scientific and medical (ISM) band, a Wi-Fi module may use channel 1 to channel 14 for transmitting and receiving data packets. Other radios, such as Bluetooth, Bluetooth low energy (BLE) or Zigbee module, may use non-overlapping channels with proper guard band to avoid signal collision with the Wi-Fi signals. The throughput of the Wi-Fi channel is highly correlation to the guard band between the Bluetooth/BLE channels and the Wi-Fi channel, that is, the Wi-Fi channel has better throughput due to lower interference if the Bluetooth/BLE channels are far away from the Wi-Fi channel.

To improve the throughput of the Wi-Fi channel, the Bluetooth may use less channels to provide a larger guard band. However, the Bluetooth specification indicates that the Bluetooth should have at least twenty channels, so the Bluetooth performance may be degraded if the Bluetooth channels suffer the interferences, especially the Bluetooth may not work properly if the quantity of the clean channels is less than twenty.

SUMMARY

It is therefore an objective to provide a wireless communication method, which can dynamically control/adjust the channels used by the wireless communication module such as Bluetooth, BLE or Zigbee, to solve the above-mentioned problems.

According to one embodiment of the present invention, a wireless communication method of a wireless device is provided, wherein the wireless device comprises a first wireless module and a second wireless module. The wireless communication method is dynamically controlling/adjusting channels used by the first wireless module by increasing or decreasing a guard band between communications of the first wireless module and the second wireless module.

According to one embodiment of the present invention, a wireless device having a first wireless module and a second wireless module is disclosed, wherein the wireless device comprises a circuitry configured to: dynamically controlling/adjusting channels used by the first wireless module by increasing or decreasing a guard band between communications of the first wireless module and the second wireless module.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
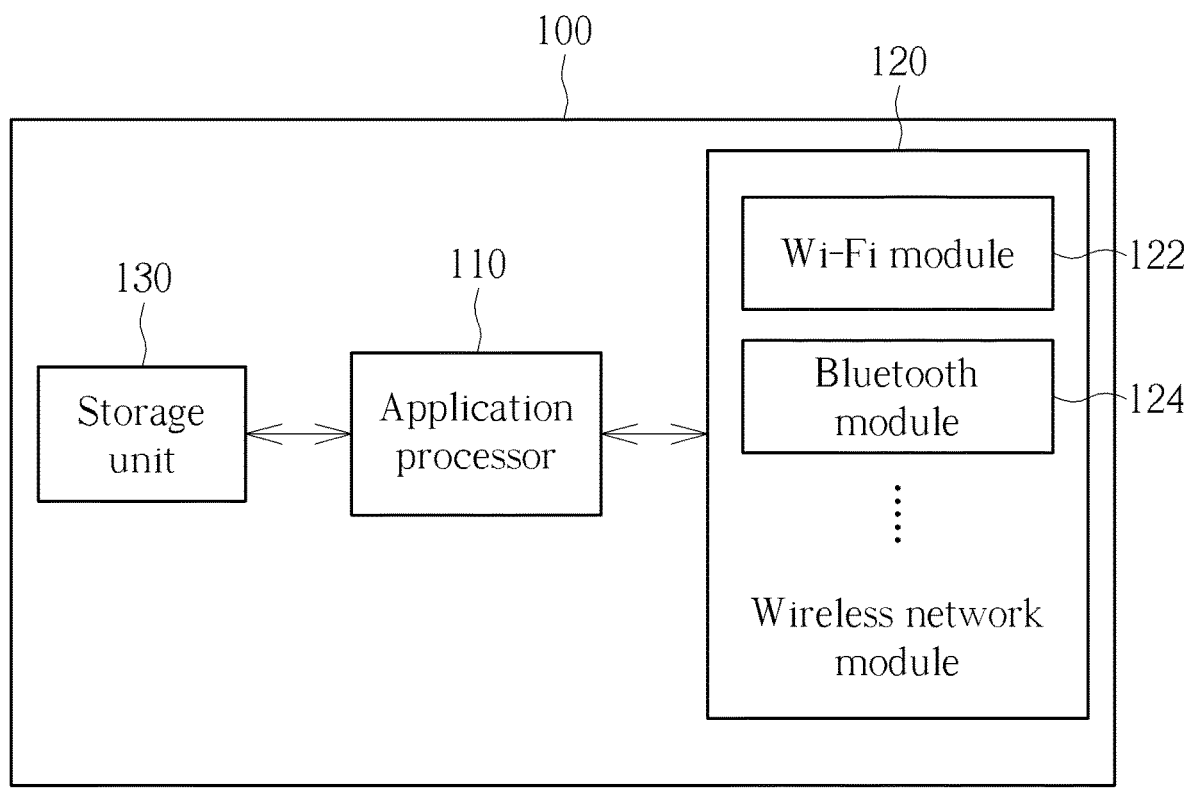
FIG. 1 is a diagram illustrating a wireless device according to one embodiment of the present invention.

FIG. 1 is a diagram illustrating a wireless device 100 according to one embodiment of the present invention. In this embodiment, the wireless device 100 may be an electronic device such as a TV, a smartphone, a tablet, a notebook or any other electronic device, and the wireless device 100 comprises an application processor 110, a wireless network module 120 and a storage unit 130. The application processor 110 is arranged to execute applications running on a system of the wireless device 100. The wireless network module 120 may comprise a Wi-Fi module 122, a Bluetooth module 124 and/or any other suitable network circuit such as BLE or Zigbee capable of connecting to Internet or other electronic devices. The storage unit 130 may comprise a plurality of different storage devices, and stores data related to the application processor 110 and the wireless network module 120.

When both the Wi-Fi module 122 and the Bluetooth module 124 are used to communicate with the electronic device (s) simultaneously, the Wi-Fi module 122 may select one of the channels 1-14 for transmitting and receiving data packets, and the Bluetooth module 124 may use an adaptive frequency hopping (AFH) mechanism or any other out-band mechanism(s) to select at least twenty channels that is not overlapped with the selected Wi-Fi channel, and the Bluetooth module 124 rapidly switches the used channel among the at least twenty channels by using a pseudo-random manner. In this embodiment, the channels used by the Bluetooth module 124 can be dynamically controlled/determined by increasing or decreasing a guard band between the Wi-Fi channel and the Bluetooth channels, to maintain the performance of the Bluetooth module 124.

Figure 2A:
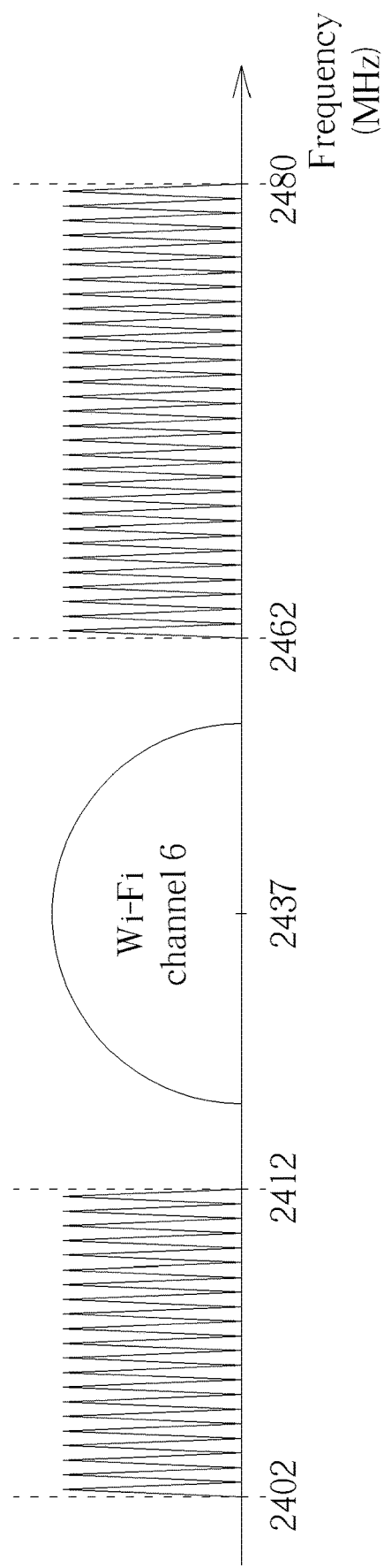
FIGS. 2A-2C shows a method for controlling the channels used by the Bluetooth module according to one embodiment of the present invention.
Figure 2B:
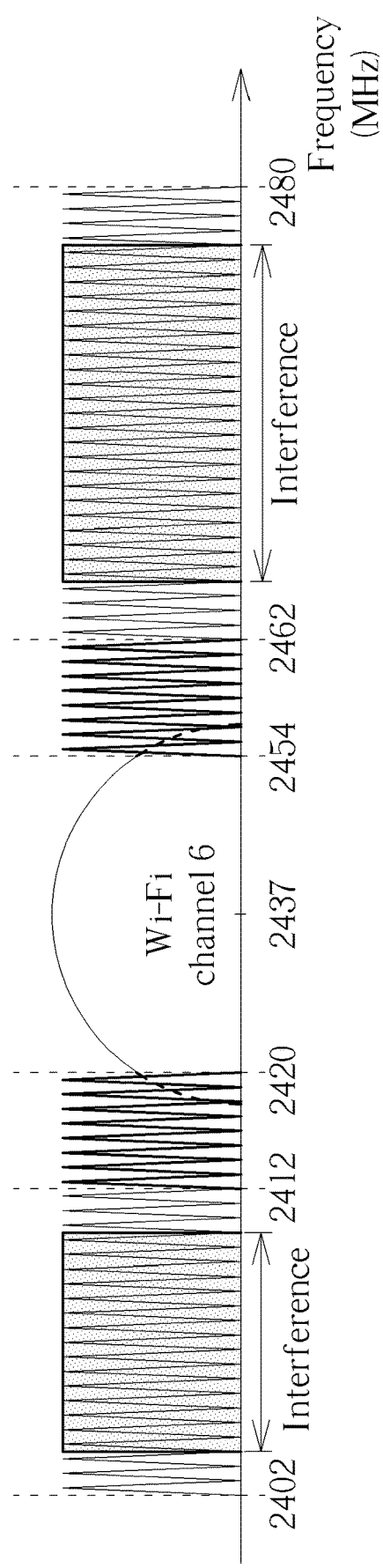
Figure 2C:
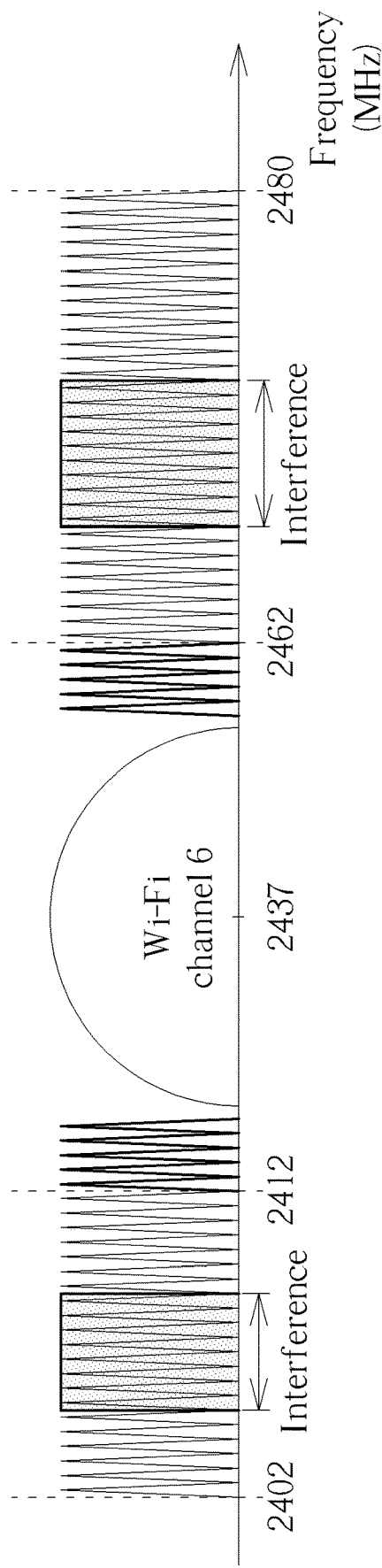

Specifically, FIGS. 2A-2C show a method for controlling the channels used by the Bluetooth module 124 according to one embodiment of the present invention. As shown in FIG. 2A, it is assumed that the Wi-Fi module 122 selects channel 6 (with frequency 2437 MHz) for data communications, and the Bluetooth module 124 initially uses the AFH mechanism to determine a plurality of channels ranging from 2402 MHz-2412 MHz and 2462 MHz-2480 MHz for data communications (frequency hopping). At this time, the Bluetooth channels and the Wi-Fi channels have at least a first frequency difference 25 MHz (i.e. 2437 MHz-2412 MHz=25 MHz, or 2462 MHz-2437 MHz=25 MHz), and the Bluetooth channels and the Wi-Fi channels have the suitable guard band to make the Wi-Fi channel have the better throughput.

If the Bluetooth channels suffer interference(s), and the AFH mechanism determines that some channels have serious interference (bad channels), the Bluetooth module 124 may not work properly because some channels suffer the interference and the Bluetooth specification indicates that at least twenty channels are required for data transmission and reception. In this embodiment, when the Bluetooth channels have the quality issue and the channels capable of being properly used (i.e. good Bluetooth channels) is lower than a first threshold value (e.g. twenty channels), the Bluetooth module 124 activates the channels at the guard band to provide more Bluetooth channels to AFH to select to maintain the performance of the Bluetooth module 124. Taking FIG. 2B as an example, most of the Bluetooth channels suffer the interferences caused by other radios such as another Wi-Fi, Bluetooth or microwave, and the quantity of the good channels is less than twenty channels. At this time, the Bluetooth module 124 actives the channels at the guard band to make more than twenty good Bluetooth channels be used for data transmission and reception, where FIG. 2B shows activating sixteen channels at the guard band. In this embodiment, for the consideration of the Wi-Fi throughput, the increased Bluetooth channels should have a second frequency different such as 10 MHz from the Wi-Fi channel.

The embodiment shown in FIG. 2B indicates that if it is determined that the channel quality of the Bluetooth module 124 does not satisfy a criteria, some channels at the guard band are activated for the use of the Bluetooth module 124 to maintain the Bluetooth performance, even if the Wi-Fi throughput may be degraded due to narrower guard band. In the present application, the Bluetooth is generally applied for audio communications, mouse, or keyboard whose performance is sensitive to the user, therefore, it is worth degrading the Wi-Fi throughput to maintain the Bluetooth performance if the Bluetooth channels suffer the interferences.

Then, if the AFH mechanism determines that the interferences are mitigated and the good Bluetooth channels become more as shown in FIG. 2C, the Bluetooth module 124 may disable some channels to increase the guard band to increase the throughput of the Wi-Fi channel. For example, if the Bluetooth module 124 determines that a quantity of the good Bluetooth channels is greater than a second threshold value (e.g. 25), the Bluetooth module 124 may disable some Bluetooth channels until the Bluetooth channels and the Wi-Fi channel have the first frequency difference.

It is noted that the embodiment shown in FIGS. 2A-2C are for illustrative purposes only, as long as the channels at the guard band can be activated or disabled for the use of the Bluetooth module 124, the parameters such as the aforementioned first frequency difference, second frequency difference, the first threshold value, the second threshold value, the quantity of the activated channels and the quantity of disabled channels can be configured according to the engineer's design. In addition, the Bluetooth mentioned in the embodiments shown in FIGS. 2A-2C may be replaced by the other wireless module such as BLE module or Zigbee module.

Figure 3:
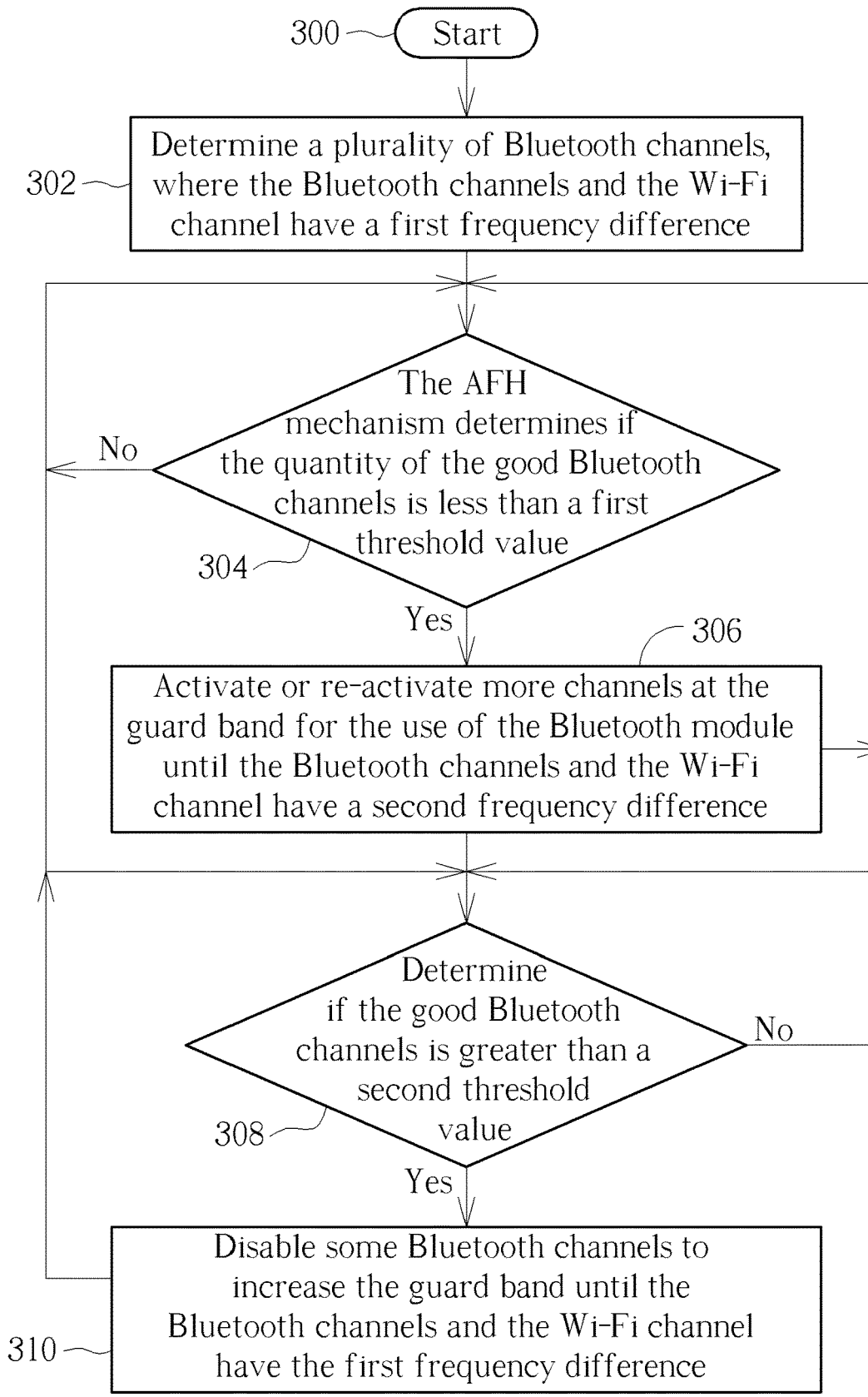
FIG. 3 is a flowchart of a method for dynamically controlling the Bluetooth channels according to one embodiment of the present invention.

The method for dynamically controlling the Bluetooth channels shown in FIGS. 2A-2C can be summarized as a flowchart shown in FIG. 3. Referring to FIG. 3, the flow is described as follows.

Step 300: the flow starts.

Step 302: the Bluetooth module determines a plurality of Bluetooth channels, where the Bluetooth channels and the Wi-Fi channel have the first frequency difference (e.g. 25 MHz).

Step 304: The AFH mechanism determines if the quantity of the good Bluetooth channels is less than a first threshold value (e.g. twenty)? If yes, the flow enters Step 306; if not, the flow stays at the Step 304 to keep monitoring the quality or quantity of the Bluetooth channels.

Step 306: Activate or re-activate more channels (e.g. five or ten channels) at the guard band for the use of the Bluetooth module, and the flow goes back to the Step 304, until the Bluetooth channels and the Wi-Fi channel have the second frequency difference (e.g. 10 MHz) and Step 308, until the Bluetooth channels and the Wi-Fi channel have the first frequency difference (e.g. 25 MHz).

Step 308: The Bluetooth module determines if the good Bluetooth channels is greater than a second threshold value (e.g. 25). If yes, the flow enters Step 310; if not, the flow stays at the Step 304 and Step 308 to keep monitoring the quality or quantity of the Bluetooth channels.

Step 310: the Bluetooth module disables some Bluetooth channels to increase the guard band, and the flow goes back to the Step 308, until the Bluetooth channels and the Wi-Fi channel have the first frequency difference (e.g. 25 MHz) and Step 304, until the Bluetooth channels and the Wi-Fi channel have the second frequency difference (e.g. 10 MHz).

Briefly summarized, in the wireless communication method of the present invention, the Bluetooth channels may be controlled/adjusted by activating or disabling the channels at the guard band between the Bluetooth channels and the Wi-Fi channels according to the channel qualities. Therefore, the Bluetooth performance may be more stable to provide better user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method of a wireless device, wherein the wireless device comprises a first wireless module and a second wireless module, and the wireless communication method comprises:

dynamically controlling/adjusting channels used by the first wireless module by increasing or decreasing a guard band between communications of the first wireless module and the second wireless module;

wherein the step of dynamically controlling/adjusting the channels used by the first wireless module comprises:

detecting a channel quality of the first wireless module to generate a detection result;

in response to the detection result indicating that the channel quality does not satisfy a criteria, activating the channels at the guard band for a use of the first wireless module when the second wireless module is in use, to increase a quantity of channels used by the first wireless module;

after the channels used by the first wireless module is increased by activating the channels at the guard band, detecting the channel quality of the first wireless module to generate another detection result; and in response to the another detection result indicating that the channel quality is above the criteria, disabling a portion of the channels used by the first wireless module to increase the guard band between communications of the first wireless module and the second wireless module.

2. The wireless communication method of claim 1, wherein the first wireless module is a Bluetooth, Bluetooth low energy (BLE) or Zigbee module, and the second wireless module is a Wi-Fi module.

3. A wireless communication method of a wireless device, wherein the wireless device comprises a first wireless module and a second wireless module, and the wireless communication method comprises:
dynamically controlling/adjusting channels used by the first wireless module by increasing or decreasing a guard band between communications of the first wireless module and the second wireless module;
wherein the first wireless module is a Bluetooth module, the second wireless module is a Wi-Fi module, and the step of dynamically controlling/adjusting the channels used by the first wireless module comprises:
setting the Bluetooth module to make the channels used by the Bluetooth module and a Wi-Fi channel have a first frequency difference;
determining if a quantity of good channels of the Bluetooth module is less than a first threshold value; and
if the quantity of the good channels of the Bluetooth module is less than the first threshold value, activating the channels at the guard band for a use of the Bluetooth module until the channels used by the Bluetooth module and the Wi-Fi channel have a second frequency difference, wherein the second frequency difference is less than the first frequency difference;
after the step of activating the channels at the guard band for the use of the Bluetooth module, determining if the quantity of the good channels of the Bluetooth module is greater than a second threshold value, wherein the second threshold value is greater than the first threshold value; and
when the quantity of the good channels of the Bluetooth module is greater than the second threshold value, starting to disable a portion of the channels used by the Bluetooth module.

4. The wireless communication method of claim 3, wherein the step of dynamically controlling/adjusting the channels used by the first wireless module further comprises:
enabling an adaptive frequency hopping (AFH) mechanism to determine the good channels capable of being used by the Bluetooth module.

5. The wireless communication method of claim 3, wherein the step of dynamically controlling the quantity of channels used by the first wireless module further comprises:
when the quantity of the good channels of the Bluetooth module is greater than the second threshold value, starting to disable a portion of the channels used by the Bluetooth module until the channels used by the Bluetooth module and the Wi-Fi channel have the first frequency difference.

6. A wireless device having a first wireless module and a second wireless module, comprising:
a circuitry configured to:
dynamically controlling/adjusting channels used by the first wireless module by increasing or decreasing a guard band between communications of the first wireless module and the second wireless module;
wherein the step of dynamically controlling/adjusting the channels used by the first wireless module comprises:
detecting a channel quality of the first wireless module to generate a detection result;
in response to the detection result indicating that the channel quality does not satisfy a criteria, activating the channels at the guard band for a use of the first wireless module when the second wireless module is in use, to increase a quantity of channels used by the first wireless module;
after the channels used by the first wireless module is increased by activating the channels at the guard band, detecting the channel quality of the first wireless module to generate another detection result and
in response to the another detection result indicating that the channel quality is above the criteria, disabling a portion of the channels used by the first wireless module to increase the guard band between communications of the first wireless module and the second wireless module.

7. The wireless device of claim 6, wherein the first wireless module is a Bluetooth, Bluetooth low energy (BLE) or Zigbee module, and the second wireless module is a Wi-Fi module.

8. A wireless device having a first wireless module and a second wireless module, comprising:
a circuitry configured to:
dynamically controlling/adjusting channels used by the first wireless module by increasing or decreasing a guard band between communications of the first wireless module and the second wireless module;
wherein the first wireless module is a Bluetooth module, the second wireless module is a Wi-Fi module, and the step of dynamically controlling/adjusting the quantity of channels used by the first wireless module comprises:
setting the Bluetooth module to make the channels used by the Bluetooth module and a Wi-Fi channel have a first frequency difference;
determining if a quantity of good channels of the Bluetooth module is less than a first threshold value; and
if the quantity of the good channels of the Bluetooth module is less than the first threshold value, activating the channels at the guard band for a use of the Bluetooth module until the channels used by the Bluetooth module and the Wi-Fi channel have a second frequency difference, wherein the second frequency difference is less than the first frequency difference;
after the step of activating the channels at the guard band for the use of the Bluetooth module, determining if the quantity of the good channels of the Bluetooth module is greater than a second threshold value, wherein the second threshold value is greater than the first threshold value; and
when the quantity of the good channels of the Bluetooth module is greater than the second threshold value, starting to disable a portion of the channels used by the Bluetooth module.

9. The wireless device of claim 8, wherein the step of dynamically controlling/adjusting the channels used by the first wireless module further comprises:
enabling an adaptive frequency hopping (AFH) mechanism or another out-band mechanism to determine the good channels capable of being used by the Bluetooth module.

10. The wireless device of claim 8, wherein the step of dynamically controlling/adjusting the channels used by the first wireless module further comprises:

when the quantity of the good channels of the Bluetooth module is greater than the second threshold value, starting to disable a portion of the channels used by the Bluetooth module until the channels used by the Bluetooth module and the Wi-Fi channel have the first frequency difference.

* * * * *